(12) United States Patent
Joye

(10) Patent No.: US 8,065,735 B2
(45) Date of Patent: Nov. 22, 2011

(54) METHOD OF SECURING A CALCULATION OF AN EXPONENTIATION OR A MULTIPLICATION BY A SCALAR IN AN ELECTRONIC DEVICE

(75) Inventor: Marc Joye, Saint Zacharie (FR)

(73) Assignee: Gemalto SA, Meudon (FR)

( * ) Notice: Subject to any disclaimer, the term of this patent is extended or adjusted under 35 U.S.C. 154(b) by 546 days.

(21) Appl. No.: 12/282,806

(22) PCT Filed: Mar. 8, 2007

(86) PCT No.: PCT/EP2007/052197
§ 371 (c)(1),
(2), (4) Date: Sep. 12, 2008

(87) PCT Pub. No.: WO2007/104706
PCT Pub. Date: Sep. 20, 2007

(65) Prior Publication Data
US 2009/0175455 A1    Jul. 9, 2009

(30) Foreign Application Priority Data

Mar. 16, 2006    (FR) ..................................... 06 50884

(51) Int. Cl.
*H04L 9/00* (2006.01)
(52) U.S. Cl. ............................................. 726/23; 380/1
(58) Field of Classification Search .................. None
See application file for complete search history.

(56) References Cited

FOREIGN PATENT DOCUMENTS
WO    WO 00/25204 A    5/2000
WO    WO 2004/055756 A1    7/2004

OTHER PUBLICATIONS

Joye, Marc "Hightly Regular Right-to-Left Algorithms for Scalar Multiplication" Cryptographic Harddware and Embedded Systems—CHES 2007, vol. 4727 of Lecture Notes in Computer Science, Springer, 2007.*
BRier et al. "Weierstrab Elliptic Curves and Side-Channel Attacks" Public Key Cryptography, vol. 2274 of Lecture Notes in Computer Science, Springer-Verlag, 2002.*
Coron, Jean-Sebastien "Resistance against Differential Power Analysis for Elliptic Curve Cryptosystems" CHES'99 LNCS 1717, 292-302, 1999.*
Ciet et al. "(Virtually) Free Randomization Techniques for Elliptic Curve Cryptography," ICICS 2003, LNCS 2836, 2003.*
Joye M: "Recovering lost efficiency of exponentiation algorithms on smart cards" Electronics Letters, IEE Stevenage, GB vol. 38, No. 19, Sep. 12, 2002, pp. 1095-1097.
PCT/ISA/210 (International Search Report).
PCT/ISA/220 (Written Opinion).

* cited by examiner

*Primary Examiner* — Kaveh Abrishamkar
(74) *Attorney, Agent, or Firm* — Buchanan Ingersoll & Rooney PC

(57) ABSTRACT

A cryptographic operation includes calculating a multiplication of an element of an additively denoted group by a scalar. After two registers $R_0+R_1$, are initialized, iterations are carried out over the components $K_i$ of the scalar K. If $K_i$ of the scalar equals 0, then the value in register $R_1$ is replaced by $2(R_0+R_1)$ If $K_i$ equals 1, the value in register $R_0$ is replaced by $2(R_0+R_1)$. At the end of the algorithm, the value of the register $R_0$ is returned as the calculated result. This method poses the advantage of carrying out a calculation of multiplying by a scalar by carrying out only doubling and adding operations of the type $2(A+B)$.

9 Claims, 4 Drawing Sheets

METHOD OF SECURING A CALCULATION OF AN EXPONENTIATION OR A MULTIPLICATION BY A SCALAR IN AN ELECTRONIC DEVICE

CROSS-REFERENCE TO RELATED APPLICATIONS

This application is the United States National Phase under 35 U.S.C. §371 of PCT International Patent Application No. PCT/EP2007/052197, filed on Mar. 8, 2007, and claiming priority to French Application No. 0650884, filed on Mar. 16, 2006.

FIELD OF THE INVENTION

The present invention relates to a method for calculating an exponentiation or a multiplication by a scalar, with application in particular in the field of cryptology.

The invention specifically applies to cryptographic algorithms implemented in electronic devices such as smart cards.

BACKGROUND OF THE INVENTION

Numerous cryptographic algorithms are based on exponentiation calculations of the type $y=x^r$, where x is an element of an assembly noted in a multiplicative manner and r a predetermined number, which encode a value y. This is particularly the case with the RSA (Rivest, Shamir and Adleman) algorithm. The value y may correspond for example to an encrypted text or to a signed or verified datum.

Various types of exponentiation algorithms exist. The "square and multiply" (SAM) binary method, the Yacobi method, known as MM3 or the sliding windows method are known in particular.

Said algorithms must include suitable counter-measures against attacks aiming to discover the information contained and manipulated in the processes carried out by the calculation device.

In particular, counter-measures are provided against so-called simple or differential hidden channel attacks. Simple or differential hidden channel attack is understood to mean an attack based on a physical magnitude that can be measured from outside the device, and the direct analysis (simple attack) or analysis according to a statistical method (differential attack) make it possible to discover the information contained and manipulated in the processes carried out. Said attacks thus make it possible to discover confidential information. Said attacks have in particular been disclosed by Paul Kocher (Advances in Cryptology—CRYPTO '99, vol. 1666 of Lecture Notes in Computer Science, pp. 388-397. Springer-Verlag, 1999). Among the physical magnitudes which can be exploited for this purpose are current consumption, electromagnetic field, etc. Said attacks are based on the fact that the manipulation of a bit, i.e. the processing thereof by a specific instruction has a particular imprint on the physical magnitude considered according to its value.

The aforementioned exponentiation algorithms have had to include counter-measures for preventing said attacks from succeeding.

An effective counter-measure to differential attacks is to make random the inputs and/or outputs of the exponentiation algorithm used for calculating $y=x^r$. In other words, it involves making the operand x and/or the exponent r random.

Concerning the simple attacks, it is known to secure said algorithms by eliminating all of the connections conditional to the value of the datum processed or the connections via which a different operation is executed.

If the example of the method the most commonly used in public key cryptographic systems is taken, the binary method, also designated by the SAM (for "square and multiply") method, two variants of implementation exist, depending on whether the bits of the number r are scanned from right to left or from left to right.

In the first case, for a right to left scanning, the SAM algorithm can be written in the following manner:

Inputs of the algorithm: x, $r=(r_{m-1}, r_{m-2}, ..., r_0)$ in base 2.
Outputs of the algorithm: $y=x^r$.
Temporary registers used: $R_0, R_1$.
Initialisation: $R_0 \leftarrow 1$ (neutral element of the multiplication); $R_1 \leftarrow x$.
For i=0 to m−1, carry out:
  If $r_i=1$, then $R_0 \leftarrow R_0.R_1$
  $R_1 \leftarrow (R_1)^2$
End for
Return $R_0$.

In the second case, for a left to right scanning, the SAM algorithm can be written in the following manner:

Inputs of the algorithm: x, $r=(r_{m-1}, r_{m-2}, ..., r_{-2})$ in base 2.
Outputs of the algorithm: $y=x^r$.
Temporary registers used: $R_0$.
Initialisation: $R_0 \leftarrow 1$ (neutral element of the multiplication);
For i=m−1 to 0, carry out:
  $R_0 \leftarrow (R_0)^2$
  If $r_i=1$, then $R_0 \leftarrow R_0.x$
End for
Return $R_0$.

However, said algorithms have the disadvantage of implementing a condition on the value of the bits $r_i$, which makes same sensitive to hidden channel attacks.

To secure said algorithms in relation to simple hidden channel attacks, the method generally used is to eliminate the connections conditional to the value of the number r (the secret key), such that a constant code algorithm is obtained. The secured binary method, thus becomes the so-called "square and multiply always" method, or SMA algorithm, i.e. a method wherein a multiplication and an elevation to the square are carried out systematically.

In the case of a left to right scanning, the secured SMA algorithm can be written as follows:

Inputs of the algorithm: x, $r=(r_{m-1}, r_{m-2}, ..., r_0)$ in base 2.
Outputs of the algorithm: $y=x^r$.
Temporary registers used: $R_0, R_1$
Variable used: b
Initialisation: $R_0 \leftarrow 1$ (neutral element of the multiplication);
For i=m−1 to 0, carry out:
  $R_0 \leftarrow (R_0)^2$
  $b=1-r_i$;
  $R_b \leftarrow R_0.x$
End for
Return $R_0$.

In said algorithm, a useless multiplication is carried out, when the bit $r_i$ of the number r equals 0. The performances of the resulting secured algorithm in terms of number of multiplications to be carried out are therefore reduced.

Generally, the securing of exponentiation algorithms by adding dummy operations in relation to simple attacks affects the performances of said algorithms in a significant manner.

Moreover, algorithms including dummy operations are sensitive to safe-error attacks. Indeed, by injecting a fault at a precise moment during the calculations, it is possible to detect if an operation is dummy or not, and in this way to deduce a secret. Said type of "safe-error" attack has, for example, been described in the publication by MM Yen and Joye "Checking before output may not be enough against fault based cryptanalysis" in the IEEE journal "Transactions on Computers", 49(9):967-970, 2000.

Finally, it must be understood for the purposes of the application that exponentiation calculations in multiplicative groups are equivalent to multiplications by a scalar in additively denoted groups. In the rest of the present application, and without indication to the contrary, an additive notation will be used, such as used for example in elliptical curves. Said notation must in no circumstances be considered as a limitation to the invention.

SUMMARY OF THE INVENTION

The object of the invention in particular is to overcome the disadvantages of prior art in the calculation of a multiplication by a scalar during cryptographic calculations, in particular during calculation of cryptographic keys.

In particular, a first aim of the invention is to provide a method for calculating the multiplication by a scalar which is relatively protected against simple, hidden channel attacks and "safe-error" attacks.

Another aim of the invention is to provide a method for calculating the multiplication by a scalar which is unconditional.

Another aim of the invention is to provide a method for calculating the multiplication by a scalar which is relatively high-performance in terms of number of operations.

Another aim of the invention is to provide a method for calculating the multiplication by a scalar which is relatively high-performance in terms of types of operations to be implemented.

Another aim of the invention is to provide a method for calculating the multiplication by a scalar which is relatively high-performance in terms of memory space used.

Another aim of the invention is to carry out a calculation of multiplication by a scalar by carrying out only doubling and adding operations of the $2 \cdot A + B$ type.

At least one of said aims is achieved by the invention the first objective of which is a method for calculating a multiplication of an element of an additively denoted group by a scalar, said scalar being broken down into a representation comprising a plurality of components, each of said components taking a component value from at least one first component value and a second component value, said method being intended for being implemented in an electronic device, said electronic device comprising at least one memory comprising at least one first register and a second register, said first register storing a first register value, said second register storing a second register value characterised in that said method comprises steps consisting of:

allocating to said first register a first initial register value as first register value, said first initial register value dependent on said element;

allocating to said second register a second initial register value as second register value, said second initial register value dependent on said element;

carrying out an iteration on said plurality of components of said representation, said iteration comprising steps consisting of, for each of the components of said representation:

when said component is equal to said first component value, calculating a first calculation value equal to the double of said first register value added to said second register value;

allocating said first calculation value to said first register as first register value;

when said component is equal to said second component value, calculating a second calculation value equal to the double of said second register value added to said first register value;

allocating said second calculation value to said second register as second register value;

following said iteration, returning at least one register value from said first register value and said second register value.

In this way, at each iteration on the components of the representation of the scalar, only one of the two registers is modified. For said modified register, the register value, corresponding to the current value of the register at each iteration, is modified for example according to a formula of the type $R_b \leftarrow 2 \cdot R_b + R_{kj}$ if $k_j$ is the binary value of the component of the representation during the iteration, b equaling $1-k_j$. The operations performed at each step on registers $R_0$ and $R_1$ are therefore of the type $2 \cdot R_0 + R_1$ or $2 \cdot R_1 + R_0$ at each iteration. Thus, a multiplication is calculated by using only the doubling and adding operations at each iteration.

According to a specific embodiment enabling only additions to be carried out at each iteration, said memory can comprise a third register, said third register storing a third register value, and the abovementioned method can comprise steps consisting of:

allocating to said third register a third initial register value as third register value, said second initial register value dependent on said first initial register value and on said second initial register value;

said iteration comprising steps consisting of:

when said component is equal to said first component value, calculating a first calculation value equal to said first register value added to said third register value;

allocating said first calculation value to said first register as first register value;

when said component is equal to said second component value, calculating a second calculation value equal to said second register value added to said third register value;

allocating said second calculation value to said second register as second register value;

calculating a third calculation value equal to said first register value added to said second register value;

allocating said third calculation value to said third register as third register value.

According to said embodiment, a third register $R_2$ is introduced, and the calculation at each iteration of the value $2 \cdot R_0 + R_1$ (respectively $2 \cdot R_1 + R_0$) is carried out by an intermediate calculation of the type $R_0 + R_2$ (respectively $R_1 + R_2$), the register $R_2$ keeping as third register value, the value $R_0 + R_1$ equal to the first register value added to the second register value. Thus a doubling calculation is avoided during the iteration. Said embodiment may be advantageous if only the adding operation is implemented in the electronic device whereon is implemented the method according to the invention.

Still in said embodiment, in order to take account of the parity of the scalar via which the element of the group is multiplied, said representation comprises an initial component taking an initial component value from a first initial component value and a second initial component value, and the abovementioned method may comprise, following said iteration, steps consisting of:

when said initial component has an initial component value equal to said first initial component value;

calculating a fourth calculation value equal to said first register value subtracted from a final value dependent on said element;

allocating said fourth calculation value to said first register as first register value.

According to the invention, it is possible to adjust the initial values of the registers enabling the multiplication to be carried out. Thus, according to one embodiment, said group comprises a neutral element, and said first initial register value may be equal to said neutral element and said second initial register value may be equal to said element.

According to another embodiment of the invention, said first initial register value may be equal to said element and said second initial register value may also be equal to said element, and said third initial register value may also be equal to the double of said element.

The invention also relates to a cryptographic device for calculating a multiplication of an element of an additively denoted group, by a scalar, said scalar being broken down into a representation comprising a plurality of components, each of said components taking a component value from at least one first component value and a second component value, wherein said device comprises calculation means and at least one memory, said memory comprising at least:
one first register;
a second register;
and wherein said calculation means are suitable for carrying out steps of the abovementioned method.

According to one embodiment, said memory may comprise a third register and said calculation means may be suitable for carrying out steps of the abovementioned method, in particular when a third register is used.

The invention also relates to a smart card comprising a device such as previously described.

It also relates to a cryptographic system based on a cryptographic algorithm bringing into play at least one calculation of a multiplication of a element of an additively denoted group, by a scalar said calculation being carried out by a device such as previously described.

BRIEF DESCRIPTION OF THE DRAWINGS

The invention and the advantages which follow will appear more clearly from reading the following description and the examples of embodiments given purely as an illustrative example, by referring to the appended figures wherein.

DETAILED DESCRIPTION OF THE INVENTION

Figure 1:
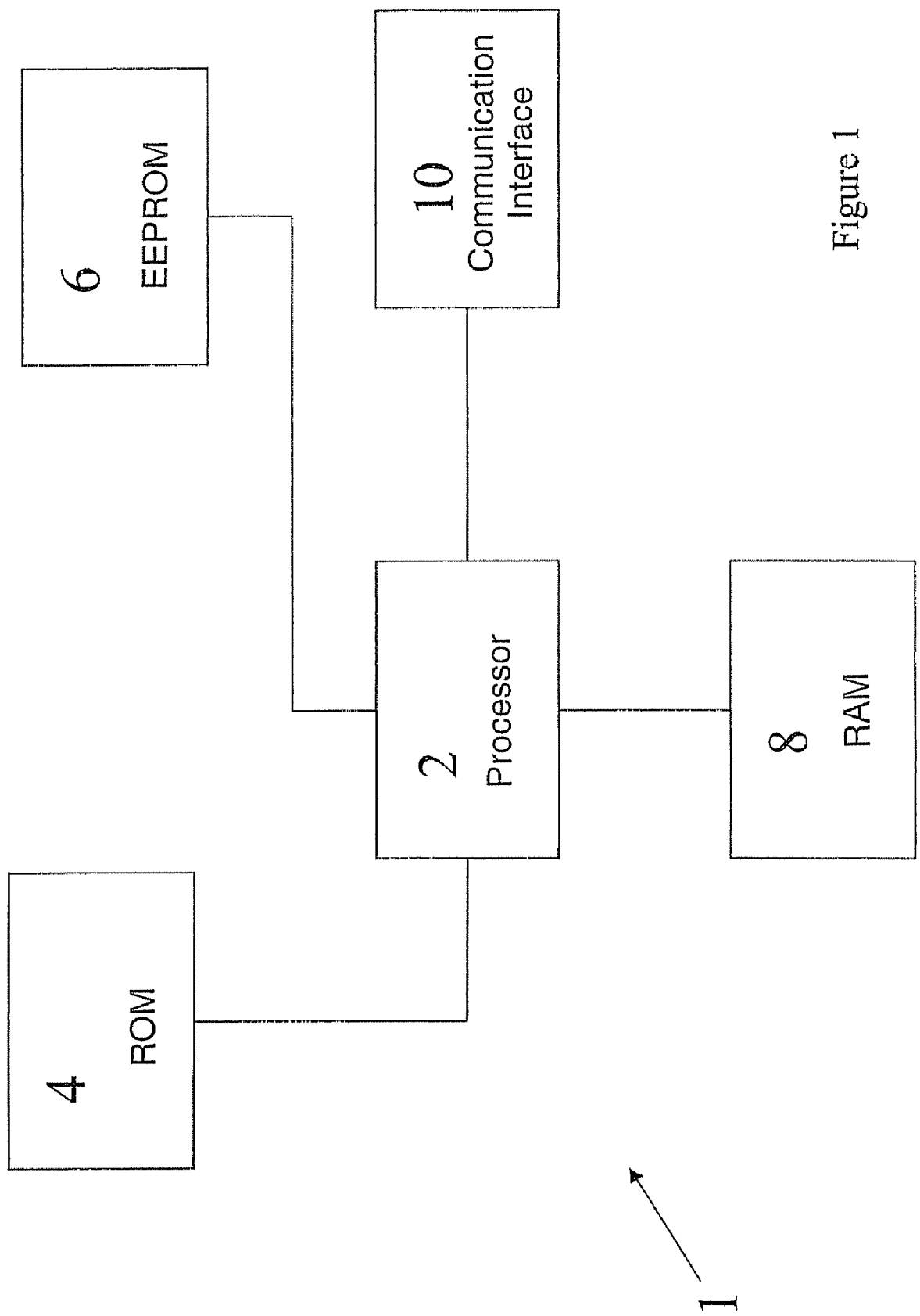
FIG. 1 is an organisational chart of the main elements of an electronic device, for example a smart card, enabling the invention to be implemented.

FIG. 1 shows in the form of a block diagram an electronic device suitable for carrying out multiplication calculations by a scalar. In the example, said device is a smart card intended for executing a cryptographic program.

To this end, the device 1 brings together in a smart card programmed calculation means, consisting of a central unit 2 functionally connected to a set of memories whereof:

a memory 4 that is accessible in read only, in the example of the type mask ROM, also known as "mask Read-Only Memory", a memory 6 that can be electrically reprogrammed, in the example of the type EEPROM ("Electrically Erasable Programmable ROM"), and a work memory 8 that is accessible in read and write, in the example of the type RAM ("random access memory"). Said memory 8 comprises in particular the registers used by the device 1.

The executable code corresponding to the multiplication algorithm is contained in program memory. Said code can in practice be contained in memory 4, that is accessible in read only, and/or in memory 6, re-writable.

The central unit 2 is connected to a communication interface 10 which provides the exchange of signals in relation to the exterior and the supply of the chip.

Said interface may comprise studs on the card for a so-called "with contact" connection with a reader, and/or an antenna in the case of a so-called "without contact" card.

One of the functions of the device is to encrypt and decrypt confidential data respectively transmitted to, and received from, the outside. Said data may relate for example to personal codes, medical information, accounts on banking or business transactions, or authorisations for access to certain restricted services. Another function consists of calculating a digital signature or of the verification thereof.

To this end, the central unit 2 executes a cryptographic algorithm based on programming data which are stored in the mask ROM 4 and/or EEPROM 6 portions.

The cryptographic algorithm may be based on an RSA (Rivest, Shamir and Adleman) algorithm, which involves a modular exponentiation calculation of the type $y=x^r$, where x is a predetermined value and r, a whole number which constitutes a key. The number y thus obtained constitutes an encrypted, decrypted, signed or verified datum.

The number r (the key) is stored in a portion of re-writable memory 6, of EEPROM type in the example.

When the exponentiation calculation device 1 is requested for a $y=x^r$ type exponentiation calculation, the central unit memorises the number x, transmitted by the communication interface 10, in work memory 8, in a calculation register.

In a current embodiment, the central unit will read the key r contained in re-writable memory 6, for memorising same temporarily, the exponentiation calculation time, in a calculation register of the work memory. The central unit therefore launches the exponentiation or multiplication algorithm by a scalar according to the invention.

Figure 2:
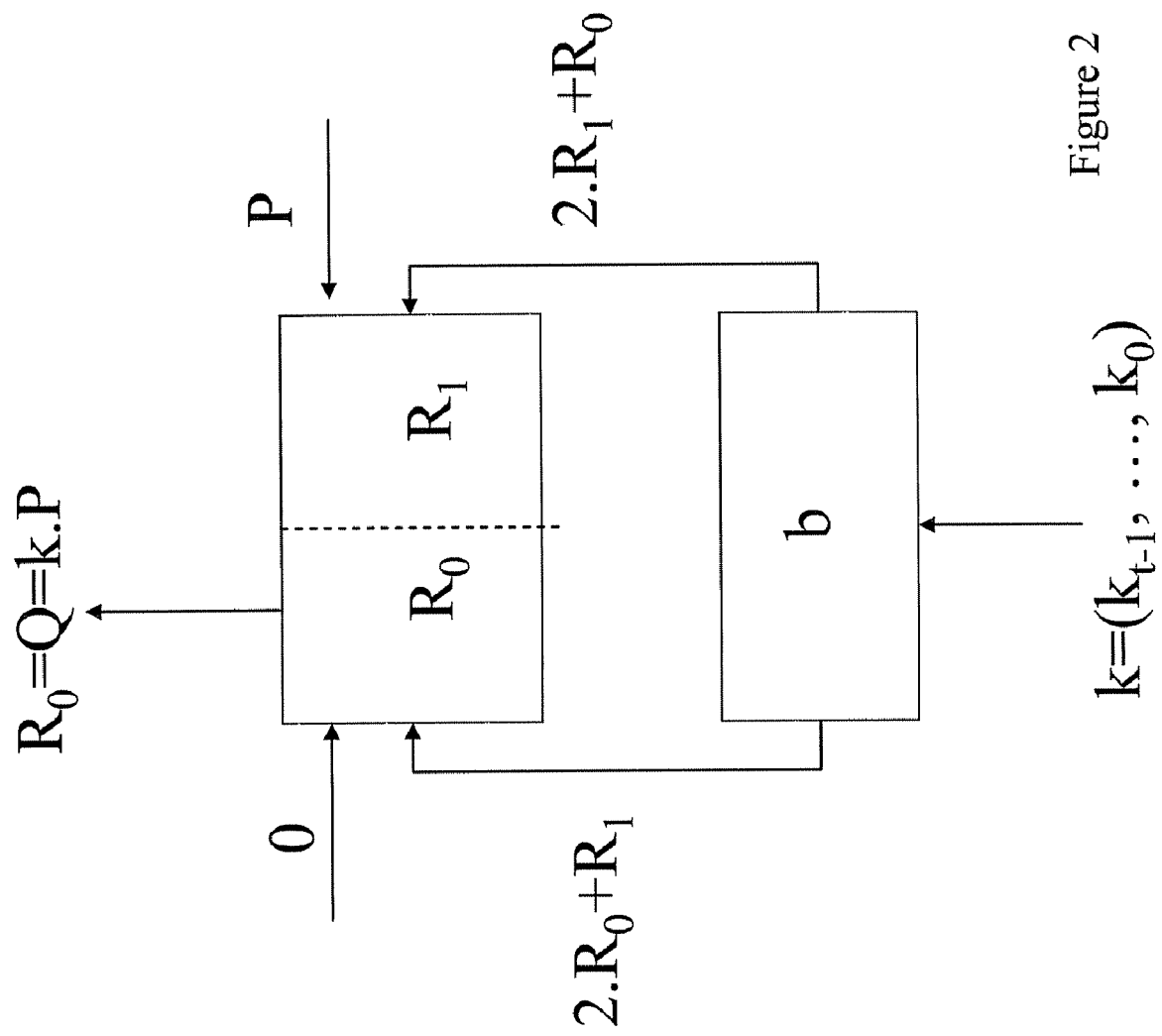
FIG. 2 shows a diagram of the method implemented in the calculation of a multiplication by a scalar according to a first embodiment of the invention.

A first embodiment is now described of a method for calculating a multiplication by a scalar according to the invention in reference to FIG. 2.

According to said embodiment, the algorithm of multiplication by a scalar is carried out as follows in pseudo language:

ALGORITHM 1.

Inputs of the algorithm: P, k= $(k_{t-1}, k_{t-2},..., k_0)_2$.
Outputs of the algorithm: Q=k·P
Temporary registers used: $R_0, R_1$
Initialisation: $R_0 \leftarrow 0$ $R_1 \leftarrow P$;
For j=0 to t−1, carry out:
    b=1−$k_j$; $R_b \leftarrow 2 \cdot R_b + R_{kj}$
End for
Return $R_0$.

In this way, at each iteration on the $k_j$, only a doubling operation and an addition is calculated, without requiring conditions, as opposed to "square and multiply" or "add and double" type algorithms from prior art and without carrying out dummy operations.

Indeed, according to said algorithm, during the iteration, only either $2 \cdot R_0 + R_1$, or $2 \cdot R_1 + R_0$ is calculated, and if $k_j$ equals 1, the value of $R_0$ is replaced by $2 \cdot R_0 + R_1$, and if $k_j$ equals 0, the value of $R_1$ is replaced by $2 \cdot R_1 + R_0$.

The stages of said algorithm ALGORITHM 1 are schematically illustrated in FIG. 2. As illustrated in said figure, firstly registers $R_0$ and $R_1$ are initialised respectively with the values 0 and P. Then an iteration is carried out on the binary decomposition of k. The values of the binary decomposition, 0 or 1, are stored for example in a temporary variable b equal to 1−$k_i$ for each component $k_i$ of the scalar k. If b equals 0, then the value $2 \cdot R_0 + R_1$ is calculated and $R_0$ is replaced by said value. If b equals 1, then the value $2 \cdot R_1 + R_0$ is calculated and $R_1$ is replaced by said value.

Figure 4:
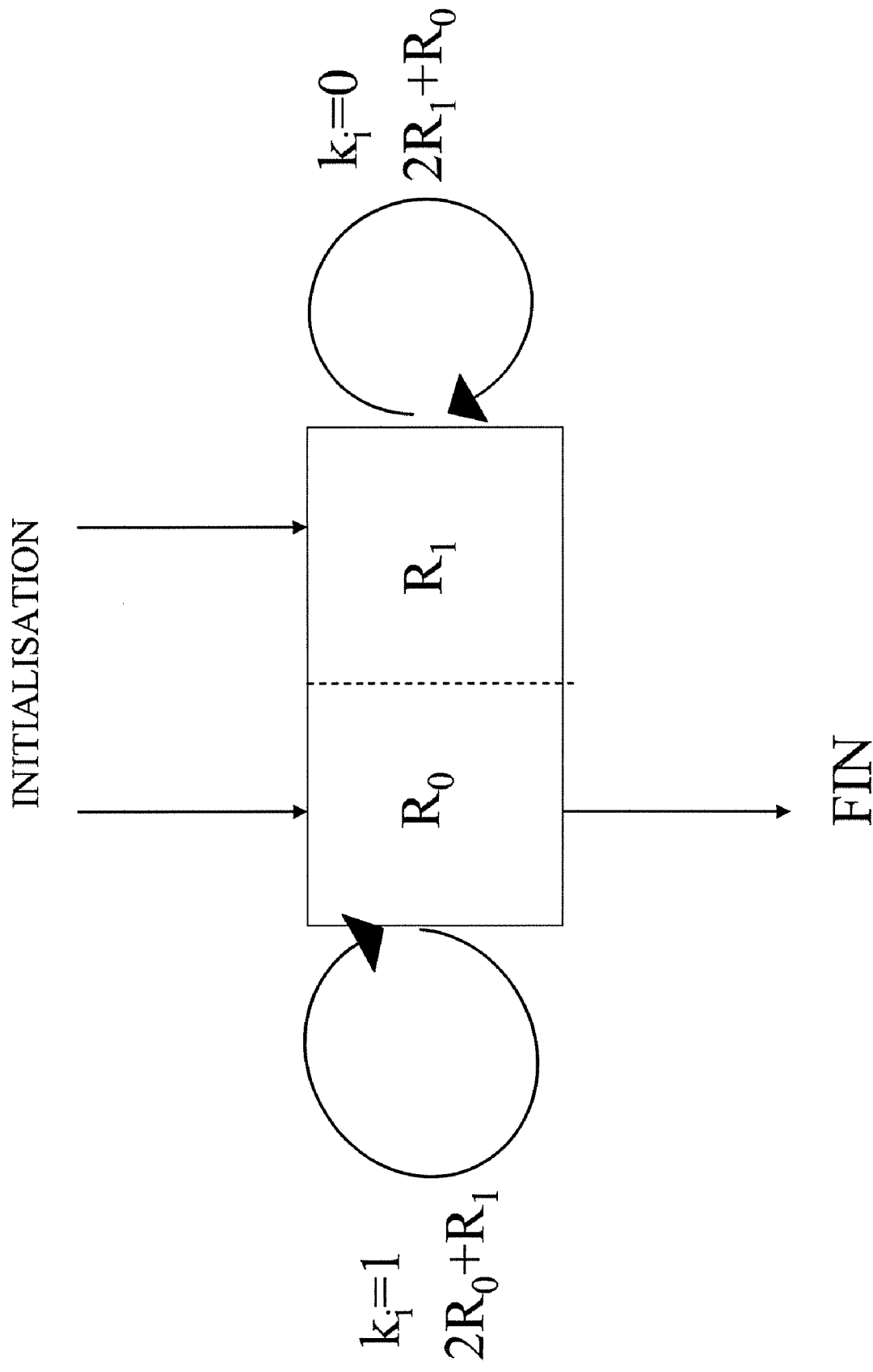
FIG. 4 shows a general diagram of the method implemented in the present invention.

As illustrated more generally in FIG. 4, the method according to the invention therefore comprises a step for initialising two registers $R_0$ and $R_1$, an iteration step on the components $k_i$ of the scalar k, wherein if $k_i$ equals 0, $2 \cdot R_1 + R_0$ is calculated and $R_1$ is replaced by said value and if $k_i$ equals 1, $2 \cdot R_0 + R_1$ is calculated and $R_0$ is replaced by said value. At the end of the algorithm, the value of the register $R_0$ is therefore returned.

It is now demonstrated that the above-proposed algorithm indeed enables a multiplication of an element P of a group to be carried out by a number k.

For this, the additive notation is used. In the calculations below, we will use the following mathematical operations:

SUM($A_i$, 0, n) designates the sum for i ranging from 0 to n of $A_i$, i.e.

$$\text{in current notation: SUM } (A_i, 0, n) = \sum_{i=0}^{n} A_i;$$

the + sign is used to designate the addition in an additively denoted group or to designate the addition between two scalars;
the − sign is used to designate the subtraction in an additively denoted group or to designate the subtraction between two scalars;
the * sign is used to designate a multiplication between two scalars;
the · sign is used to designate the multiplication by a scalar in an additively denoted group. The notation k·P therefore designates the sum P+P+ . . . +P k times;
The notation k=$(k_{t-1}, \ldots, k_0)_2$ designates the decomposition of a scalar k in binary in vectorial notation. Said notation is equivalent to the notation in the form of a sum k=SUM($k_j*2^j$, 0, t−1);

the notation A←a designates the operation consisting of allocating to the variable A, the value a. It also designates the operation consisting of allocating to the register A, the value a.

I.e. therefore G an additive Abelian group of neutral element 0. Or P in G, and k, a whole number coded on t bits in binary. Therefore, one looks to calculate, in said additive notation, the multiplication by a scalar Q=k·P, i.e. P+P+ . . . +P k times.

I.e. k=SUM($k_j*2^j$, 0, t−1), with $k_j$ belonging to the assembly {0,1}.

One has Q=SUM(($k_j*2^j$) P, 0, t−1)=SUM ($k_j \cdot B_j$, 0, t−1) with $B_j=2^j \cdot P$;

Or even $S_j$=SUM($k_i \cdot B_i$, 0, j) and $T_j=B_{j+1}−S_j$;

With said notations, it becomes:

$$S_j = \text{SUM } (k_i \cdot B_i, 0, j) = k_j \cdot B_j + S_{j-1}$$
$$= k_j \cdot (S_{j-1} + T_{j-1}) + S_{j-1} = (1 + k_j) \cdot S_{j-1} + k_j \cdot T_{j-1};$$

Likewise, $$T_j = B_{j+1} - S_j$$
$$= 2 \cdot B_j - (k_j \cdot B_j + S_{j-1}) = (2 - k_j) \cdot B_j - S_{j-1} =$$
$$= (2 - k_j) \cdot T_{j-1} + (1 + k_j) \cdot S_{j-1};$$

Thus, for every j greater than or equal to 0, one has:

$$S_j = S_{j-1} \quad \text{if } k_j = 0$$
$$= 2 \cdot S_{j-1} + T_{j-1} \quad \text{if } k_j = 1;$$

and $$T_j = S_{j-1} + 2 \cdot T_{j-1} \quad \text{if } k_j = 0$$
$$= T_{j-1} \quad \text{if } k_j = 1;$$

As Q=k·P=$S_{t-1}$, this demonstrates that the algorithm ALGORITHM 1 indeed returns the value of Q as output. It is also noted that to each iteration of the loop in j, the registers $R_0$ and $R_1$ respectively contain the values $S_j$ and $T_j$. The abovementioned algorithm ALGORITHM 1 therefore indeed enables the multiplication Q=k·P to be calculated, and this by using only 2·A+B type operations in additive notation.

Other specific embodiments of the invention are now described.

According to a second embodiment of the invention, an algorithm is provided still only carrying out 2·A+B type operations, but by using only additions, and by prevent the use of the calculation of a doubling.

The result is an algorithm ALGORITHM 2 corresponding to a variant of the algorithm 1. Said algorithm can be described as follows:

---
ALGORITHM 2
---

Inputs of the algorithm: $P, k=(k_{t-1}, k_{t-2}, \ldots, k_0)_2$.
Outputs of the algorithm: $Q=k \cdot P$
Temporary registers used: $R_0, R_1, R_2$
Initialisation: $R_0 \leftarrow P$; $R_1 \leftarrow -P$; $R_2 \leftarrow -2P$
For $j=1$ to $t-1$, carry out:
    $b=1-k_j$; $R_b \leftarrow R_b + R_2$
    $R_2 \leftarrow R_0 + R_1$
End for
$b \leftarrow k_0$; $R_b \leftarrow -R_b - P$
Return $R_0$.

---

Figure 3:
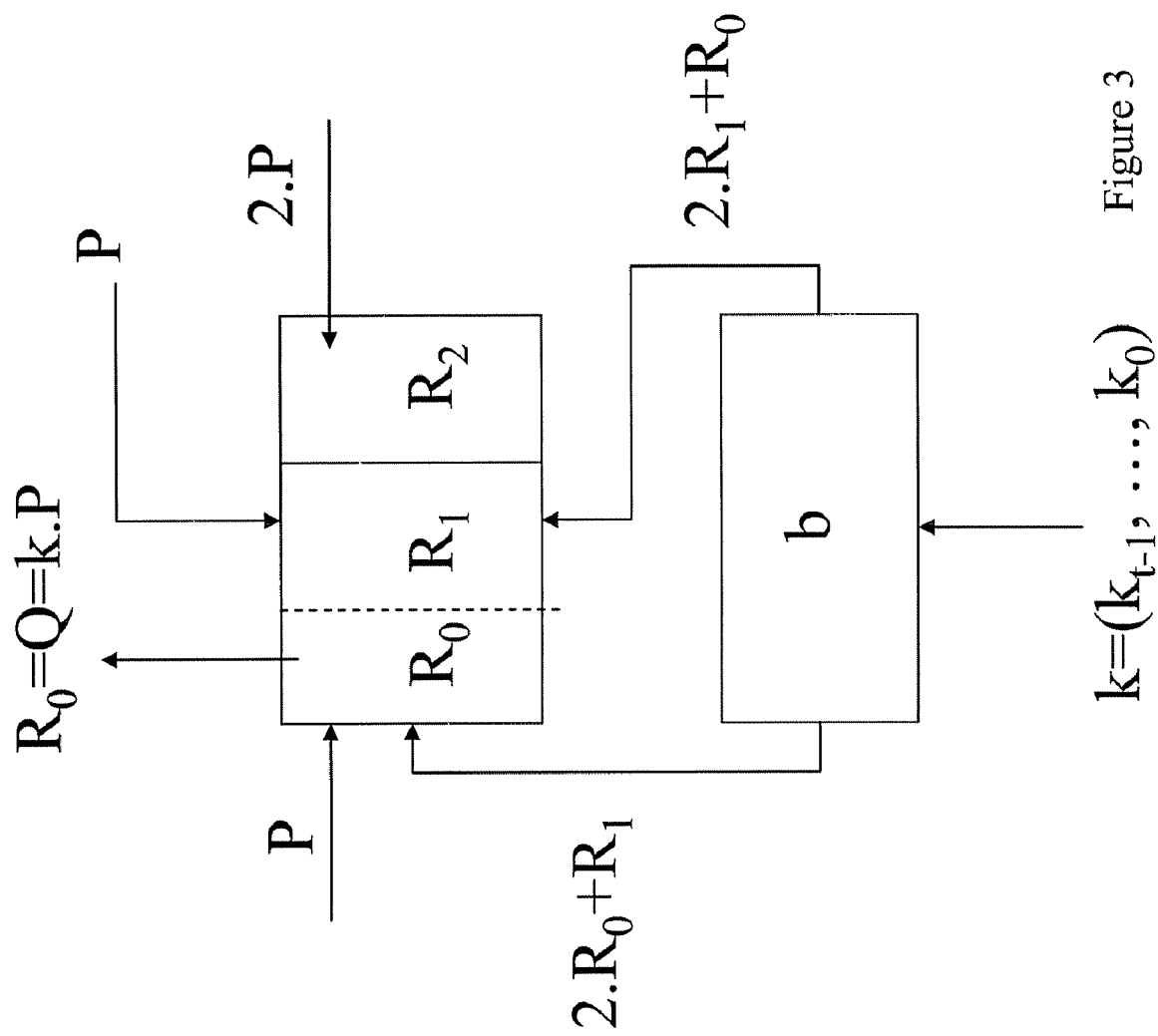
FIG. 3 shows a diagram of the method implemented in the calculation of a multiplication by a scalar according to a second embodiment of the invention.

The stages of said algorithm ALGORITHM 2 are schematically illustrated in FIG. 3. As illustrated in said figure, firstly registers $R_0$, $R_1$ and $R_2$ are initialised respectively with the values P, P and $2 \cdot P$. Then an iteration is carried out on the binary decomposition of k for k ranging from 1 to $t-1$. The values of the binary decomposition, 0 or 1, are stored for example in a temporary variable b equal to $1-k_i$ for each component $k_i$ of the scalar k. If b equals 0, then the value $2 \cdot R_0 + R_1$ is calculated and $R_0$ is replaced by said value. If b equals 1, then the value $2 \cdot R_1 + R_0$ is calculated and $R_1$ is replaced by said value. Said calculation is carried out by means of the register $R_2$ to which a value equalling $R_0 + R_1$ is allocated. Thus, by calculating $R_0 + R_2$ or $R_1 + R_2$, only the calculation of values $2 \cdot R_0 + R_1$ or $2 \cdot R_1 + R_0$ is carried out, in accordance with the invention. Finally, if $k_0$ equals 0, at the loop end the value $R_0$ is replaced by $R_0 - P$.

It is now demonstrated that the above-proposed algorithm ALGORITHM 2 indeed enables a multiplication of an element P of a group to be carried out by a scalar k. The preceding notations are also used hereafter.

By using said notations, it is known that $B_{j+1} = S_j + T_j$. The register $R_2$ therefore an intermediate register serving to store a variable representative of said value $B_{j+1}$.

To prove that the algorithm ALGORITHM 2 indeed carries out the calculation of $Q=k \cdot P$, let us presume that k is odd, i.e. that $k_0 = 1$. It is also presumed that k is strictly less than the order of P in the additive group G.

I.e. $k_{I-1}$ the highest non-zero bit in the decomposition of k, or $k_{I-1}$ and $k_j = 0$ for j between I and $t-1$.

In this case, as k is odd, the register $R_0$ still contains odd multiples of P. Likewise, as $T_j = 2^{j+1} \cdot P - S_j$, the register $R_1$ still contains odd multiples of P for j strictly less than $I-1$. Finally, the register $R_2$ still contains a multiple of P by a power of 2 for j strictly less than $I-1$.

Thus, in the calculation of $R_b \leftarrow R_b + R_2$, one still has $R_b$ different from $R_2$ for j between 1 and $I-2$.

Likewise, in the calculation of $R_2 \leftarrow R_0 + R_1$, one still has $R_0$ different from $R_1$ for j between 1 and $I-2$.

Finally, when j is equal to $I-1$, the register $R_0$ takes the value $k \cdot P$, and is no longer modified for j between I and $t-1$.

The algorithm ALGORITHM 2 therefore indeed enables the calculation of the value $Q=k \cdot P$ to be carried out.

Finally, it is noted that the initial evaluation of the value 2P to be stored in the register $R_2$ may not require doubling. Indeed, the value $2 \cdot P$ may be pre-calculated or evaluated based on the formula $2 \cdot P = (P+A) + (P-A)$ for an element A of the additive group G.

In this way, the algorithm ALGORITHM 2 may be implemented without requiring doubling in additive notation, or elevation to the square in multiplicative notation.

In particular, this makes it possible to economise the implementation of the doubling in an electronic device, or to use the algorithm in an electronic device whereon the doubling would not be implemented, but only the addition.

It is noted moreover that by construction, one has $B_{j+1} = S_j + T_j = 2 \cdot B_j$. This therefore enables the algorithm ALGORITHM 2 to be implemented by passing from the register $R_2$ and by using only the two registers $R_0$ and $R_1$ such as in the algorithm ALGORITHM 1.

This provides an algorithm ALGORITHM 3 defined as follows:

---
ALGORITHM 3.
---

Inputs of the algorithm: $P, k=(k_{t-1}, k_{t-2}, \ldots, k_0)_2$.
Outputs of the algorithm: $Q=k \cdot P$
Temporary registers used: $R_0, R_1$
Initialisation: $R_0 \leftarrow 0$ $R_1 \leftarrow -P$;
For $j=0$ to $t-1$, carry out:
    $b=1-k_j$; $R_b \leftarrow 2 \cdot R_b$
    $R_b \leftarrow R_0 + R_1$
End for
Return $R_0$.

---

It is easily demonstrated that said algorithm enables $Q=k \cdot P$ to be calculated with the aid of the formulae given for the algorithm ALGORITHM 1 and of the relationship $B_{j+1} = S_j + T_j = 2 \cdot B_j$.

The description has been provided within the context of a smart card type electronic device. It is however clear that these instructions can be applied to any other application, such as in computer terminals, network communication terminals and in any other electronic device which uses encoding and decoding calculations.

The invention claimed is:

1. A method for performing a cryptographic operation on data in an electronic device with a key represented as a plurality of components $(k_{t-1}, \ldots, k_0)$ each having a first or second component value, said electronic device having at least one memory comprising at least one first register and a second register, said first register storing a first register value, said second register storing a second register value said method comprising the following steps:
    allocating to said first register a first initial register value as a first register value;
    allocating to said second register a second initial register value as a second register value, said second initial register value corresponding to the data on which the cryptographic operation is being performed;
    carrying out an iteration on said plurality of components of said representation, said iteration comprising the steps of, for each $(k_i)$ of the components of said key:
        when said component $(k_i)$ is equal to said first component value,
            calculating a first calculation value equal to the double of said first register value added to said second register value; and
            allocating said first calculation value to said first register as the first register value;
        when said component $(k_i)$ is equal to said second component value,
            calculating a second calculation value equal to the double of said second register value added to said first register value; and
            allocating said second calculation value to said second register, as the second register value;
    following said iteration, returning at least one register value from said first register value and said second register value as the cryptographically processed data.

2. A method according to claim 1, wherein said first initial register value is equal to zero and wherein said second initial register value is equal to said data on which the cryptographic operation is to be performed.

3. A method for performing a cryptographic operation on data in an electronic device with a key represented as a plurality of components ($k_{t-1}, \ldots, k_0$), each having a first or second component value, said electronic device having at least one memory comprising at least one first register, a second register and a third register, said first register storing a first register value, said second register storing a second register value, and said third register storing a third register value, said method comprising the steps of:
- allocating to said first register a first initial register value as a first register value;
- allocating to said second register a second initial register value as a second register value, said second initial register value corresponding to the data on which the cryptographic operation is being performed;
- allocating to said third register a third initial register value as a third register value, said third initial register value dependent on said first initial register value and on said second initial register value;
- carrying out an iteration on said plurality of components of said representation, said Iteration comprising the steps of, for each ($k_i$) of the components of said key:
  - when said component ($k_i$) is equal to said first component value,
    - calculating a first calculation value equal to said first register value added to said third register value; and
    - allocating said first calculation value to said first register as the first register value;
  - when said component ($k_i$) is equal to said second component value,
    - calculating a second calculation value equal to said second register value added to said third register value; and
    - allocating said second calculation value to said second register as the second register value;
  - calculating a third calculation value equal to said first register value added to said second register value; and
  - allocating said third calculation value to said third register as the third register value.

4. A method according to claim 3, wherein said representation comprises an initial component taking an initial component value from a first initial component value and a second initial component value, and said method comprises, following said iteration, the steps of:
- when said initial component has an initial component value equal to said first initial component value;
  - calculating a fourth calculation value equal to said first register value subtracted from a final value dependent on said element; and
  - allocating said fourth calculation value to said first register as the first register value.

5. A method according to claim 3, wherein said first initial register value is equal to said data and wherein said second initial register value is equal to said data, and wherein said third initial register value is equal to the double of said data.

6. A cryptographic device for performing a cryptographic operation on data with a key that is represented by a plurality of components ($k_{t-1}, \ldots, k_0$), where each of said components has a first component value or a second component value, said device comprising a processor and at least one memory,
said memory comprising at least:
- one first register; and
- one second register;

and wherein said processor performs the following operations:
- allocating to said first register a first initial register value as a first register value;
- allocating to said second register a second initial register value as a second register value, said second initial register value corresponding to the data on which the cryptographic operation is being performed;
- carrying out an iteration on said plurality of components of said representation, said iteration comprising the steps of, for each ($k_i$) of the components of said key:
  - when said component ($k_i$) is equal to said first component value,
    - calculating a first calculation value equal to the double of said first register value added to said second register value; and
    - allocating said first calculation value to said first register as the first register value;
  - when said component ($k_i$) is equal to said second component value,
    - calculating a second calculation value equal to the double of said second register value added to said first register value; and
    - allocating said second calculation value to said second register, as the second register value;
- following said iteration, returning at least one register value from said first register value and said second register value as the cryptographically processed data.

7. A smart card comprising a device according to claim 6.

8. A cryptographic system comprising a device according to claim 6, said device carrying out at least one calculation of a multiplication of an element of an additively denoted group, by a scalar.

9. A cryptographic device for performing a cryptographic operation on data with a key that is represented by a plurality of components ($k_{t-1}, \ldots, k_0$), where each of said components has a first component value or a second component value, said device comprising a processor and at least one memory,
said memory comprising at least:
- one first register;
- one second register; and
- one third register; and wherein said processor performs the following operations:
- allocating to said first register a first initial register value as a first register value;
- allocating to said second register a second initial register value as a second register value, said second initial register value corresponding to the data on which the cryptographic operation is being performed;
- allocating to said third register a third initial register value as a third register value, said third initial register value dependent on said first initial register value and on said second initial register value;
- carrying out an iteration on said plurality of components of said representation, said iteration comprising the steps of, for each ($k_i$) of the components of said key;
  - when said component ($k_i$) is equal to said first component value,
    - calculating a first calculation value equal to said first register value added to said third register value; and
    - allocating said first calculation value to said first register as the first register value;
  - when said component ($k_i$) is equal to said second component value,
    - calculating a second calculation value equal to said second register value added to said third register value; and allocating said second calculation value to said second register as the second register value;
calculating a third calculation value equal to said first register value added to said second register value; and
allocating said third calculation value to said third register as the third register value.

* * * * *